United States Patent [19]
Lindner et al.

[11] 3,973,894
[45] Aug. 10, 1976

[54] DEVICE FOR THE PRODUCTION OF TOOTHED BELTS

[75] Inventors: Ulrich Lindner, Berenbostel; Hugo Speichert, Garbsen; Walter Stritzke, Letter; Werner Kilian, Wettbergen; Dieter Bagowski, Nordsehl; Horst Weber, Altwarmbuchen, all of Germany

[73] Assignee: Continental Gummi-Werke Aktiengesellschaft, Hannover, Germany

[22] Filed: Apr. 8, 1974

[21] Appl. No.: 458,674

Related U.S. Application Data

[60] Division of Ser. No. 434,626, Jan. 18, 1974, abandoned, and a continuation of Ser. No. 194,226, Nov. 1, 1971, abandoned.

[30] Foreign Application Priority Data

Nov. 2, 1970 Germany............................ 2053694

[52] U.S. Cl................................. 425/370; 425/373; 425/383; 425/396; 156/138; 156/206; 264/286
[51] Int. Cl.²...................... B29C 3/00; B29C 15/00
[58] Field of Search ............ 425/373, 370, 384, 383, 425/396, 397; 264/286; 156/137–140, 205, 206; 74/231 C, 232

[56] References Cited
UNITED STATES PATENTS

| | | | |
|---|---|---|---|
| 2,328,909 | 9/1943 | Kilborn | 425/373 X |
| 2,494,642 | 1/1950 | Case et al. | 425/370 |
| 2,782,461 | 2/1957 | Eisslinger | 425/373 X |
| 3,165,783 | 1/1965 | Martelli | 425/370 X |
| 3,508,992 | 4/1970 | Chavannes | 156/205 |

FOREIGN PATENTS OR APPLICATIONS

1,011,858 12/1965 United Kingdom............... 156/138

*Primary Examiner*—Robert L. Spicer, Jr.
*Attorney, Agent, or Firm*—Walter Becker

[57] ABSTRACT

A method of and apparatus for making toothed belts of rubber or rubber-like elastic synthetic materials with an enveloping fabric covering, the belt teeth, according to which an enveloping fabric strip is folded into successive folds corresponding to the belt teeth to be formed, and the cavities defining folded portions on the inside of said fabric strip are filled with elastomeric material of the type of which the belt teeth are to be made, whereupon layers of elastomeric material and straight members making up the remainder of the belt to be made are placed upon each other to build up the belt, whereafter the thus obtained assembly is vulcanized.

17 Claims, 5 Drawing Figures

DEVICE FOR THE PRODUCTION OF TOOTHED BELTS

This is a division of co-pending application Ser. No. 434,626 — Lindner et al filed Jan. 18, 1974, now abandoned as a continuation of parent application Ser. No. 194,226 —Lindner et al filed Nov. 1, 1971, now abandoned.

The present invention relates to a method of and device for the production of toothed belts of rubber material or rubber-like elastic synthetic material with an outer enveloping fabric covering the teeth of the belt.

The covering of the belt teeth which engage gears with a continuous enveloping fabric is in most instances necessary because this covering fabric protects the elastically deformable belt teeth against wear and in addition thereto favorably influences the dynamic running behavior of the belt particularly in the critical starting and terminating areas of the enveloping loop or arc. The exposed arrangement of the fabric covering as inner mantle surface of the finished belt makes this covering the starting basis for the built-up of the raw belts in customary manufacturing processes which provide a built-up of the belt in layers from the inside toward the outside.

It has proved expedient to cover the employed tooth mold core first with the enveloping fabric, to fill in with elastomeric material the hollow spaces corresponding to the belt teeth to be produced, and subsequently to apply the other elements of the belt body. In this connection the proper enveloping of the mold core in precise adaptation to the design of the tooth flanks while avoiding any disadvantageous formation of folds causes difficulties. In order to assure that the enveloping fabric will, in all areas of the core surface provided with numerous crevices, engage the respective core surface along the entire extension of this surface and in order to exclude the danger of detachments and the faults resulting therefrom, it has heretofore been considered indispensable to fix the fabric by adhesive means on the mold core and especially in the depressions of the mold core. Inasmuch as for purposes of securing a firm connection of the enveloping fabric to the adjacent elastomeric layers of material and to assure a precise molding and forming of the belt teeth without the formation of interfering residues which are difficult to eliminate, only adhesives on a rubber basis can be employed, the finished toothed belts will after completed vulcanization have the enveloping fabric covered with a fine rubber layer. Although the thickness of this rubber layer hardly or only slightly exceeds the filling-in of the interstices of the fabric, this fine rubber layer will during use of the belt gradually wear off when the belt runs over the respective gears. The wear thus encountered is of such a minor nature that normally it has practically no disturbing effect. If, however, instead of metallic gears, gears of synthetic materials are employed as is the case, for instance, in office machines and other fine mechanical gear systems to an ever increasing extent, the rubber particles worn off from the thin rubber layer on the enveloping fabric are retained by electrostatic charges and accumulate in the tooth spaces of the gears. This results in a change in the conditions of engagement between belt and gear which changes bring about irregularities in the circulation of the belt and finally result in the complete destruction of the belt.

It is, therefore, an object of the present invention to improve the built-up of toothed belts of rubber material and the like by a reliable mechanical fixing of the enveloping fabric in the tooth mold and by avoiding adhesive connecting means in order to eliminate the cause for a later wear and the consequences inherent thereto.

This object and other objects and advantages of the invention will appear more clearly from the following specification in connection with the accompanying drawings, in which:

FIG. 1 diagrammatically illustrates a device according to the present invention.

Figure 1:
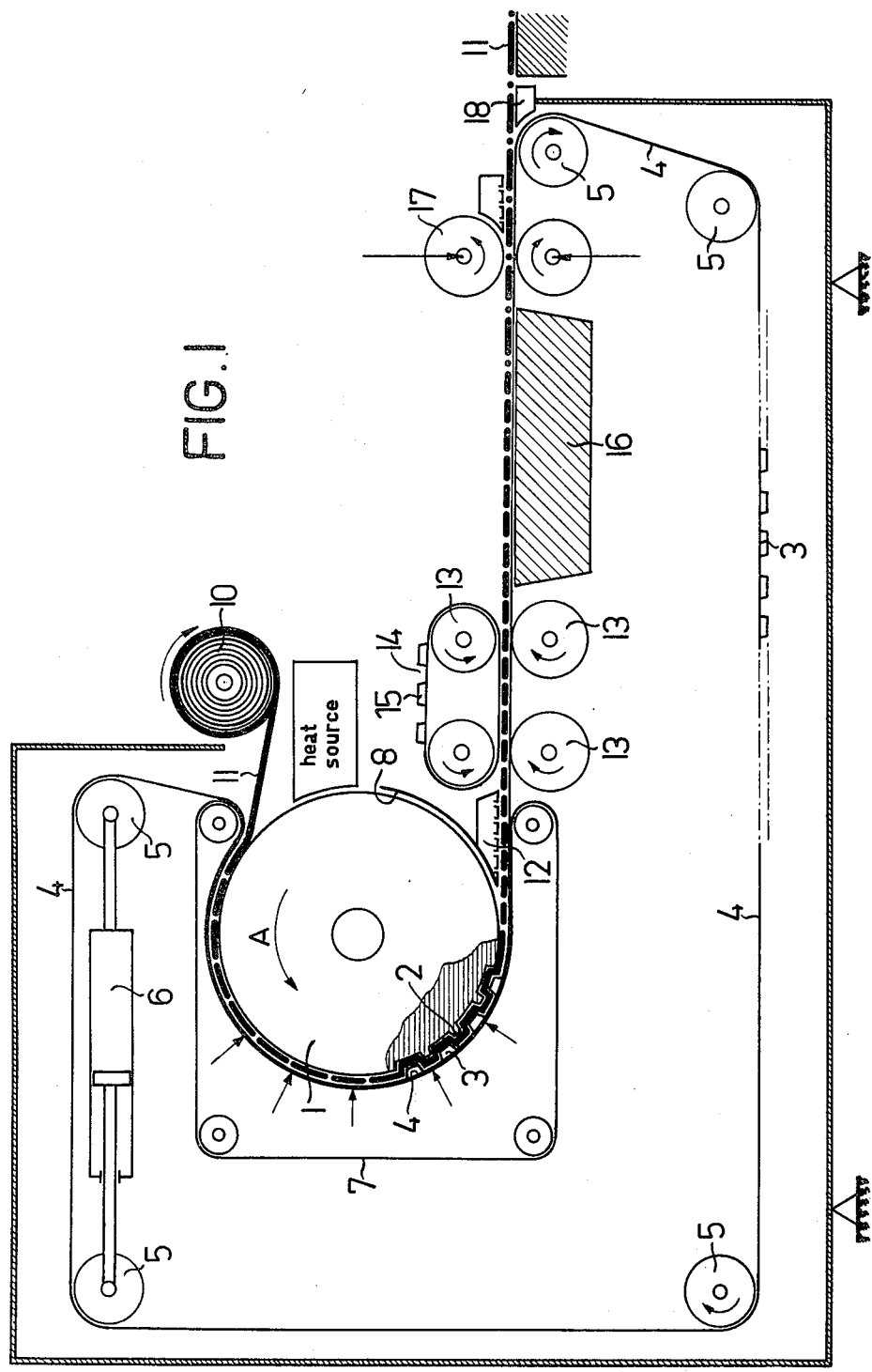

The method of making toothed belts of rubber material and rubber-like elastic materials according to the invention with an enveloping fabric covering the belt teeth is characterized primarily in that continuous hollow folds in conformity with the belt teeth to be produced are formed into the enveloping fabric. These hollow folds which are open toward the inside of the fabric are filled with the elastomeric material employed for forming the belt teeth, whereupon the remaining parts of the belt are built up in customary manner. Expediently the enveloping fabric is formed while simultaneously heat is employed, and thereupon in formed condition is cooled in order to assure a permanent shape.

The invention makes it possible completely to omit rubber adhesives or other adhesion securing means and thus creates the possibility of manufacturing satisfactory toothed belts which when in use practically are not subject to wear and therefore, independent of the property of the respective gears over which the belt moves, assure a high degree of uniformity in the running behavior of the belt and also assure a long life of the belt. The folding of the enveloping fabric in precise conformity with the shape of the teeth and the filling in of the formed hollow folds with a plastic raw mixture represents a preparatory step in the manufacture of the belt and permits the production of a precision element which is easily handled inasmuch as it forms a coherent structural element and can quickly and easily be placed upon the tooth core of the belt building device and of the vulcanizing mold. The danger of changes in the position of the enveloping fabric when the latter is placed onto the core of the mold or during the subsequent building up steps is practically excluded in view of the thermally fixed preforming in combination with the elastomeric material filling which preferably is effected at an increased pressure. The finished toothed belts therefore are free from the above referred to disadvantages and can be employed without affecting the engaging precision between the belt and the gear.

A device for practicing the method according to the present invention expediently comprises a heated molding roller adapted to be driven in the direction of movement of the belt to be built up and provided with axial grooves which are distributed over the circumference of the roller in spaced relationship to each other in conformity with the spacing between the teeth of the belt to be built up, the grooves having a cross section corresponding to the belt teeth to be produced. The device furthermore comprises an endless mold belt which is looped over a considerable angle around the roller and has uniform teeth engaging the grooves. The device also comprises cooling means for cooling the enveloping the elastomeric material has been filled into the hollow folds of the cooled fabric.

A device of this type will in spite of its structural simplicity assure the production of a properly preformed enveloping fabric pre-product in a continuous working operation. The precise forming of the hollow folds will be assured by an endless additional pressure belt which presses the molding belt at least over a part of its looping arc in radial direction against the mantle surface of the molding roller without the necessity for this purpose to have the molding belt proper subjected to higher pulling stresses. It is advantageous to dimension the radial depth of the grooves in the molding roller somewhat greater than the height of the belt teeth to be formed in order to compensate for the unavoidable shrinking of the fabric which after a heating is cooled. The magnitude of the difference in dimensions depends on the type of the fibers, the built-up and composition of the employed fabric and in particular the employed temperature. Assuming ordinary conditions, the difference in dimensions may amount to a slight fraction of the depth of the grooves. For purposes of intensively cooling the pre-formed enveloping fabric, the latter together with the supporting mold belt may directly, after it has run off the heated molding roller, be passed through two or more roller pairs through which a cooling medium is flowing while the respective roller engaging the enveloping fabric is provided with circumferential protrusions adapted to engage the hollow folds of the fabric. This positive engagement may, according to a modification of the invention, also be obtained by a follower belt wiich is looped around the rollers and is provided with toothlike elevations similar to the molding belt. By means of a jet nozzle directed toward the surface of the enveloping fabric and adapted to be connected to a source of compressed air, the total cooling effect can be further increased while simultaneously also the lifting off of the formed fabric from the grooves of the molding roller can be effected so as to avoid any disadvantageous tearing stresses.

The apparatus according to the present invention also includes a device for compacting of the elastomeric tooth material filled into the hollow folds of the enveloping fabric, for instance, a device in the form of two pressing rollers adapted to be varied as to their radial distance and arranged in spaced relationship to the preceding cooling device. The free space provided between successive machining stations creates the desired possibility of applying the elastomeric material to the folds of the fabric. This may be effected by injecting the elastomeric material in plastic condition, by inserting preformed profiled strands, or in any other suitable manner. Inasmuch as the enveloping fabric passes the pressure zone while still being combined with the molding belt, both pressing rollers may have a smooth cylindrical contour. Only after having passed through the pressing rollers, may the enveloping fabric be separated from the molding belt and employed for the built-up of the belt whereas the endless molding belt is again passed to and around the molding roller.

While the rotatable molding roller permits a continuous operation, also an intermittent processing of the method according to the invention is possible when employing flat matrices with grooves corresponding to the teeth of the belt to be produced and with associated pressing plates having protrusions engaging these grooves. Thus, according to a modification of the present invention, the pressing plates may be composed of lamellae which are displaceable relative to each other in pressing direction and are parallel or substantially parallel to the grooves. The displacement of the lamellae one after another may be effected by a slide which is movably guided in spaced relationship to the surface of the matrix in a direction transverse to the grooves and which has a pressing surface inclined in a wedge-like manner and adapted to engage the narrow side of the lamellae which faces away from the matrix.

Such a device is suitable for molding a web of fabric in sections and in repeated successive steps. In contrast to heretofore known devices of the general type involved, which grasp the total surface of the fabric section, the last mentioned device according to the invention does not require the adjustment of the yieldability of the fabric threads which is particularly high in at least one direction. Inasmuch as the lamellae subsequently pressed into the grooves of the matrix are able to pull the fabric in a tension-free manner and in conformity with the requirements, the successive forming is effected without the otherwise unavoidable creation of increasing pulling stresses. In addition to the possibility to select a fabric solely with regard to its behavior in the finished belt, the device according to the invention has the further advantage of carefully treating the fabric while avoiding the formation of tears therein and thus avoiding the tendency to reshape while assuring a complete forming of the hollow folds.

Referring now to the drawings in detail, the device shown therein comprises primarily a molding roller 1 which is adapted to be heated and which is rotatably journalled for rotation, for instance in the direction of the arrow A. The speed of rotation depends on the selected diameter of the roller and is to be so adjusted that a circumferential speed can be realized as it is most expedient for the manufacturing process. The circumferential surface of the roller is provided with axial grooves 2 which correspond to the belt teeth to be made and are slightly deeper than the height of these belt teeth. The axial grooves 2 are engaged by the teeth 3 of a forming belt 4. The belt 4 is designed as an endless practically non-stretchable belt of fabric material, synthetic material or steel, and is provided with teeth 3 which are mounted on and firmly connected to the belt 4. It is also possible instead to employ a customary toothed belt armed with strength carriers embedded thereon provided that the elastomeric belt material is able to withstand the repeated thermal stresses. The belt 4 is passed over a plurality of deviating rollers 5 one or more of which may be driven in synchronism with the molding roller 1. The belt 4 is looped around the molding roller over an angle of the magnitude of approximately 180° or more. By means of a tensioning device, for instance in the form of a pressure fluid cylinder piston system, the pulling stresses in the belt 4 may be adjusted according to the respective requirements, or by means of this cylinder piston system 6 the belt may be completely relieved from tension so as to allow a fast removal of the belt from the device. In order to increase the pressing force exerted in radial direction upon the mantle of the roller 1 over the looped area, there is provided an additional pressing belt 7. The free circumferential arc of the roller 1 is covered by a covering metal sheet 8 in order to keep the heat losses by radiation to a minimum. If desired, there may also be provided at this area infrared radiators or other additional heat sources directed toward the roller body.

Ahead of the looping arc there is located the rotatably journalled winding-off reel or roller 10 for the enveloping fabric. The enveloping fabric is as a coherent wide web passing from the reel 10 onto the circumference of the roller 1 below the forming belt 4. After the enveloping fabric 11 has passed through the forming or shaping zone in which the hollow folds corresponding to the teeth of the finished belt are embossed or formed into the fabric 11, the latter is by means of a compressed air jet nozzle 12 lifted off the roller 1 and is together with the forming belt 4 pulled into a cooling device which is formed by two roller pairs 13. The cooling rollers 13 which are passed through by water or another cooling medium are synchronously driven with the roller 1 in order to avoid any undesired slip. Those rollers 13 which in the drawing are the lower rollers, are directly in contact with the belt 4 tangentially resting on these lower rollers 13, whereas the upper rollers 13 acting upon the shaped enveloping fabric 11 have looped therearound a follower belt 14 provided with outer teeth 15 similar to teeth 13 of the forming belt, belt 14 being in the form of a flat belt drive.

The fabric belt 11 which in this way has been provided with thermally formed-in and fixed hollow folds subsequently passes over a stationary table 16 on which the tooth cores in the form of profiled strands cut to length are manually inserted into the open hollow folds. The inserted tooth cores are compacted between two pressure rollers 17 which are adjustable as to their mutual distance and are uniformly corrected as to their position within the hollow folds. The enveloping fabric is thus fully prepared for the building up of the belt and, if desired, may by means of a compressed air jet nozzle 18 be withdrawn from the downwardly directed belt 14 and conveyed to its place of employment.

Figure 3:
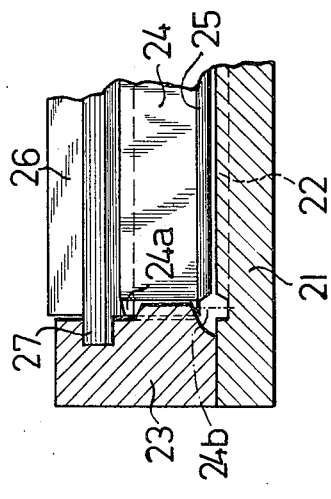
FIG. 3 is a cross section through FIG. 2, said section being taken along the line III — III of FIG. 2.
Figure 2:
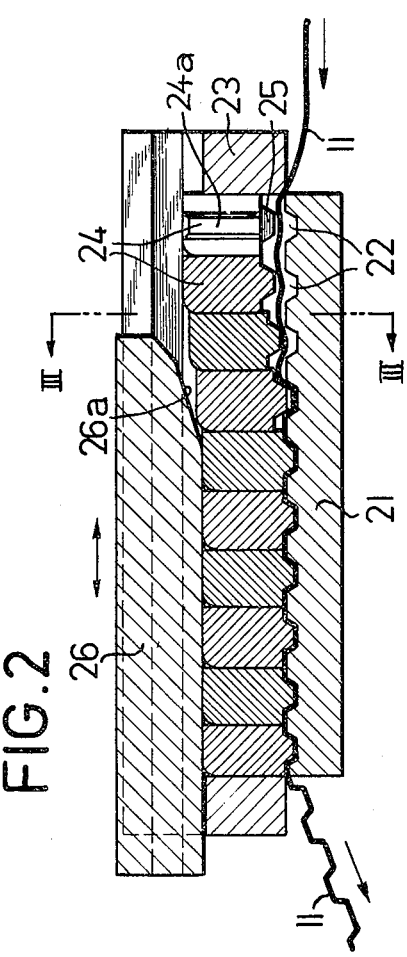
FIG. 2 shows a longitudinal section through a modified element which can be used in connection with the device according to the invention.
Figure 4:
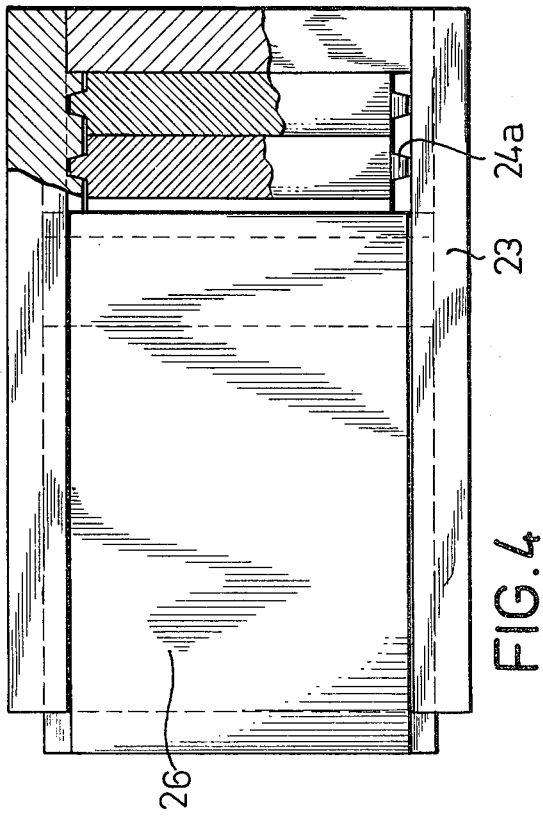
FIG. 4 is a top view of the element shown in FIG. 2.

According to the modification shown in FIGS. 2 to 4, a matrix 21 in the form of a flat plate provided with tooth grooves 22 corresponds to the rotatable forming roller 1 which means it represents the forming or shaping element of the device. The pertaining pressure plate is composed of a plurality of lamellae 24 held together by a frame 23. The lamellae are in direct mutual contact and independently of each other movable upwardly and downwardly while lateral extensions 24a assure a positive guiding within the frame 23. That side of the lamellae which faces the matrix and in the drawing forms the lower narrow side is provided with protrusions 25 which correspond to the shape of the teeth in conformity with the grooves 22. By means of the protrusions 25, the lamellae engage the grooves 22 and find an end abutment therein for their downward movement. Above the lamellae 24 there is provided a slide or carriage 26 which is reciprocable in the transverse direction of the lamellae. By means of the slide or carriage 26, the lamellae can be pressed successively downwardly into the pertaining grooves 22 of the matrix. The slide or carriage 26 is positively guided within the frame 23 by lateral guiding strips 27. The front end face of the carriage 26 has a wedge-shaped tapering portion 26a which makes possible the movement onto the lamellae 24 and simultaneously also brings about a gradual increase in the pressing pressure.

Figure 5:
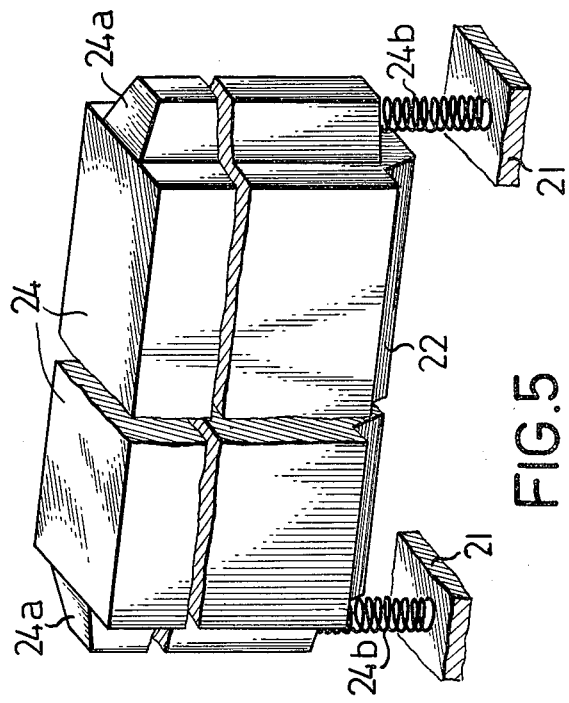
FIG. 5 shows on a larger scale a yieldable support for the lamellae.

The fabric web 11 is in sections deposited onto the matrix 21 and after the frame 23 has been put into place and locked is by any suitable clamping means (now shown) pressed into the grooves 22 by an advancement of the slide 26. The shaping or forming of the fabric web begins at the front area of the fabric web when looking in the advancing direction so that the lengthening inherent to the downward movement of the first lamella 24 can be compensated for by pulling up the fabric which is only loosely placed upon the matrix body without generating any pulling stress. With the advancement of the carriage 26 the same process is repeated on each of the lamellae 24 until after the last lamella has moved downwardly (in the drawing the right-hand outermost lamella 24), the shaping or forming has been completed, and the frame 23 can be lifted off the matrix for pulling in the next following fabric section. The shaping of the fabric folds starts each time at the same starting position of the carriage 26 into which position it has been returned from its range of section on the lamellae 24 at the end of shaping in FIG. 5 on a larger scale, the lamellae 24 rest on both sides by means of the extensions 24a on yieldable springs 24b which will yield when the respective lamella 24 is depressed and will lift said lamella again when no pressure is exerted on said lamella.

Similar to the roller 1 of the device accrding to the embodiment of FIG. 1, the matrix may also in this instance be provided wth heating devices or may be kept in contact with a heated support. For a further treatment of the fabric web 11 withdrawn from the matrix, the devices shown in connection with FIG. 1 may be employed.

It is, of course, to be understood that the present invention is, by no means, limited to the particular showing in the drawings but also comprises any modifications within the scope of the appended claims.

What we claim is:

1. An apparatus for making toothed belts of rubber and of rubber-like elastic synthetic materials with an enveloping fabric covering the belt teeth fixed thereby in very accurately spaced relationship as precision machine elements which are in meshing engagement with accurately machined gears to assure orderly function of motors, office machines, fine mechanical device and the like, which includes in combination: belt teeth shaping means having a corrugated surface with elevations and depressions in conformity with the teeth to be generated on the toothed belt to be made, moveable means equipped with identical teeth equally spaced from each other and adapted successively to enter said depressions on said belt teeth shaping means, and cooling means arranged adjacent to and following when looking in the direction in which the teeth of said movable means successively enter said depressions.

2. An apparatus in combination according to claim 1, in which said belt teeth shaping means is formed by a roller having said depressions formed by grooves substantially parallel to the axis of rotation of said roller and having a cross section corresponding to the cross section of the teeth of the toothed belt to be made, said grooves being substantially equally distributed over the circumference of said roller at a pitch corresponding to the pitch of the teeth of the toothed belt to be made, and said movable means comprising endless flexible belt having the teeth, connected thereto, said endless belt being looped around a portion of said roller.

3. An apparatus in combination according to claim 2, which includes a pressure belt passing around a portion of said roller on the outside of said endless belt forming part of said movable means for exerting radial pressure upon said endless belt.

4. An apparatus in combination according to claim 2, in which the radial depth of said grooves in said roller is greater than the height of the teeth of the belt to be made.

5. An apparatus in combination according to claim 3, in which the grooves have a depth which is a slight fraction, up to 20%, greater than the height of the teeth of the belt to be made.

6. An apparatus in combination according to claim 2, in which the roller and said endless belt are positively connected to each other and are adapted to be driven synchronously with regard to each other.

7. An apparatus in combination according to claim 1, in which said cooling means comprise at least two pairs of rollers, said pairs being located opposite to each other and being adapted to receive therebetween a fabric strip passed between said belt teeth shaping means and said movable means.

8. An apparatus in combination according to claim 7, in which one roller pair is arranged above another roller pair while the rollers of each roller pair are spaced from each other in the direction transverse to their axes of rotation, and which comprises an endless follower belt extending around the rollers of one of said pairs and provided with teeth corresponding to the tooth spaces of the toothed belt passed between the pairs of rollers.

9. An apparatus in combination according to claim 8, in which the rollers of at least one of said roller pairs is adapted to be driven synchronously with the roller forming the belt teeth shaping means.

10. An apparatus in combination according to claim 1, which includes jet nozzle means adapted to be connected to a source of compressed air and interposed between said belt teeth shaping means and said cooling means for aiding the lifting off of a corrugated belt element from said belt teeth shaping means.

11. An apparatus in combination according to claim 1, which includes pressure roller means following said cooling means when looking in the direction in which the teeth of said movable means successively enter said depressions, said pressure roller means being movable relative to each other and being adapted therebetween to receive a fabric strip passed around said belt tooth shaping means and provided by the latter with depressions and elevations in conformity with the teeth to be generated on the tooth belt to be made.

12. An apparatus in combination according to claim 1, in which said belt teeth shaping means is formed by a flat matrix comprising grooves in conformity with the teeth of the belt to be made and also comprising a pressure plate having protrusions corresponding to the grooves of said matrix, said pressure plate including a plurality of lamellae movable relative and substantially parallel to each other toward and away from said belt teeth shaping means.

13. An apparatus in combination according to claim 12, in which each lamellae has an end face which faces said belt teeth shaping means provided with a plurality of grooves corresponding in number to said pressure plate protrusions for respectively receiving same.

14. An apparatus in combination according to claim 12, in which each two lamellae which are adjacent to each other slidingly engage each other along a plane forming the plane of symmetry between two pertaining grooves which are adjacent to each other in said belt teeth shaping means.

15. An apparatus in combination according to claim 12, which includes actuating means movable in a direction transverse to the longitudinal extension of said lamellae and operable successively to engage and press one lamella after another downwardly into the grooves of said matrix, the front portion of said actuating means when considering the actuating moving direction thereof tapering in upward direction.

16. An apparatus in combination according to claim 15, which includes frame means with guiding means slidably engaging said lamellae for guiding the same in vertical direction.

17. An apparatus in combination according to claim 16, in which said guiding means engage the sides of said lamellae and extend substantially at a right angle with regard to the direction of movement of said actuating means transverse to the longitudinal extension of said lamellae.

* * * * *